_(12)_ United States Patent
Werner et al.

(10) Patent No.: US 6,767,253 B1
(45) Date of Patent: Jul. 27, 2004

(54) MEDIA-COMPONENT DOCKING SYSTEM

(75) Inventors: Shane Robert Werner, Olathe, KS (US); Benjamin James Parker, Overland Park, KS (US); Eric Michael Bloomcamp, Olathe, KS (US); Nolan Christian Aubrecht, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/289,030

(22) Filed: Nov. 6, 2002

(51) Int. Cl.[7] .............................................. H01R 25/00
(52) U.S. Cl. ...................................................... 439/638
(58) Field of Search ................................ 439/638, 650, 439/651, 652, 653, 654; 361/663, 686

(56) References Cited

U.S. PATENT DOCUMENTS

| | | | | |
|---|---|---|---|---|
| 5,030,128 A | * | 7/1991 | Herron et al. ............... | 439/372 |
| 5,460,547 A | * | 10/1995 | Belt et al. .................... | 439/638 |
| 5,569,052 A | * | 10/1996 | Belt et al. .................... | 439/638 |
| 5,604,663 A | * | 2/1997 | Shin et al. ................... | 361/686 |
| 5,699,226 A | * | 12/1997 | Cavello ....................... | 361/686 |
| 6,034,869 A | * | 3/2000 | Lin .............................. | 361/686 |
| 6,061,234 A | * | 5/2000 | Broder et al. ............... | 361/686 |
| 6,093,038 A | * | 7/2000 | Chen et al. .................. | 439/131 |
| 6,233,141 B1 | * | 5/2001 | Lee et al. .................... | 361/683 |

* cited by examiner

Primary Examiner—Tulsidas C. Patel

(57) ABSTRACT

A media docking station and is provided. A detachable media-content-receiving receiving component (MCRC) includes a connector that mates with a connection port of a docking base. The connection port operationally receives the connector. The docking base is equipped with a plurality of communications ports for communicating media content to a receiving devices inputted thorough said communications ports. In an alternative embodiment, an adapter is provided for mating a conventional MCRC with a base member.

37 Claims, 3 Drawing Sheets

MEDIA-COMPONENT DOCKING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention is related to the field of docking bases. More particularly, the present invention provides a new and useful docking base for media set-top boxes.

BACKGROUND OF THE INVENTION

Today, certain media content such as digital cable television (CATV) requires a set-top box, or some other form of media-content-receiving component (MCRC), to communicate an incoming signal to a television. Similarly, satellite TV often requires a set-top box. Moreover, a separate box is required for each wall outlet. A wall outlet is the communications port that communicates a data stream to the set-top box. Thus, one box is required for a TV in a living room and a second box is needed for a TV in a home office. In the alternative, a customer could laboriously detach all the communications-port connections interacting with the set-top box of one location and reconnect connections at a second site.

Thus, the current state of the art necessitates duplicating resources, including set-top boxes, and provides no easy way to migrate a connected box from one location to another. These exemplary shortcomings could be overcome by providing a method and system for conserving box resources and/or easily moving a box from one location to another.

SUMMARY OF THE INVENTION

The present invention solves at least the above problems by providing a set-top box docking-station system and method. Offering several practical applications in the technical arts, the present invention reduces the number of set-top boxes needed to view a media-content stream on different TVs and provides a new and useful way of easily transferring a set-top box from one location to another.

In a first aspect of the invention, a docking base is provided. The base has a receiving area that mates with a media-content-receiving component (MCRC). The receiving area has a connection port When the MCRC is placed into the base-member-receiving area, media content can be communicated through the base member and MCRC to a receiving device. Thus, the docking base can remain wired to an end-user's wall, other devices, and television With multiple docking bases, only the MCRC need be removed and slid into another base.

In another aspect of the invention, an improved MCRC is provided. This MCRC has a connector to operationally couple itself to the docking base. Media content is communicated from said docking base to a receiving device when said MCRC is mated with said docking base.

In another aspect of the invention, an MCRC-docking system is provided. A detachable MCRC is equipped with a connector. A docking base has a connection port and can operationally receive the connector on the MCRC. Again, the docking base has a plurality of communications ports for communicating media content to a receiving device.

In another aspect of the invention, a media-component-docking adapter for coupling an MCRC to a docking base having a connection port is provided. The adapter has at least two sides. On one side, the adapter is equipped with a set of communications ports. These ports mate with the ports of the MCRC. On the other side of the adapter is a connection port which is used to mate the MCRC with the base unit The base unit is connected to the end-user's cable outlet, media components, and display device. In this aspect, many adapters can be manufactured to mate specific MCRCs to the same docking station.

Finally, yet not exhaustively, a method for using a single set-top box between multiple bases to communicate media streams on multiple TVs is provided.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides an improved system that receives media content in an environment where an MCRC is necessary to decode or translate the media signals for viewing. The present invention allows a user to use a single MCRC to receive media content on various TVs without having to disconnect and reconnect the communications ports of the MCRC. Thus, instead of having to purchase multiple set-top boxes, based on the number of TVs to receive media content, a user need only purchase multiple docking bases, which are connected to the user's cable input feed, media devices, and display device. The docking base can stay connected while the set-top box or MCRC can simply be detached and replaced with no rerouting of any wires.

The present invention will be described more fully with reference to the accompanying figures where exemplary embodiments of the invention are shown. The present invention should not be construed as limited to those embodiments. Rather, the described embodiments are illustrative in nature to convey the embodiment of the concept of a docking station that receives an MCRC for watching television and its variants.

Figure 1A:
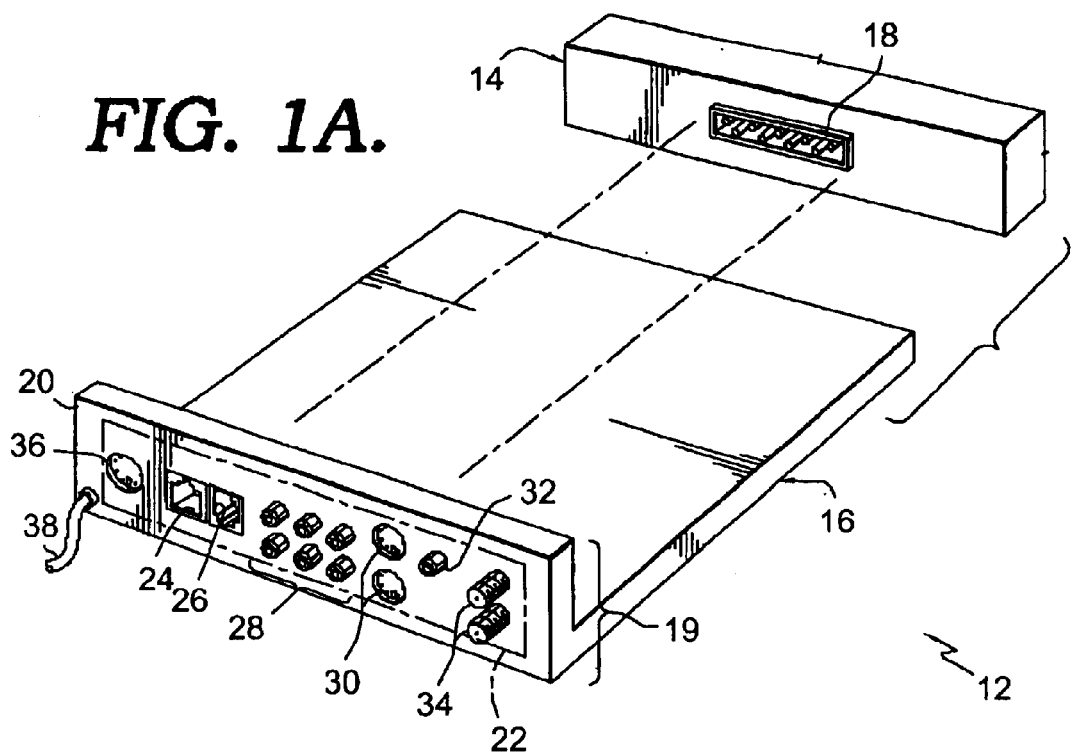
FIG. 1A is a perspective view of one embodiment of a media docking station.
Figure 1B:
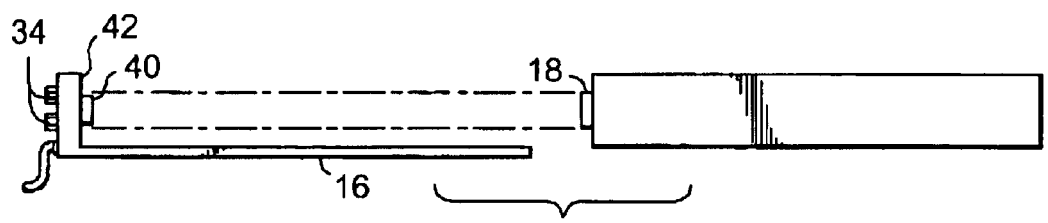
FIG. 1B is a side view of the media docking station of FIG. 1A.
Figure 1C:
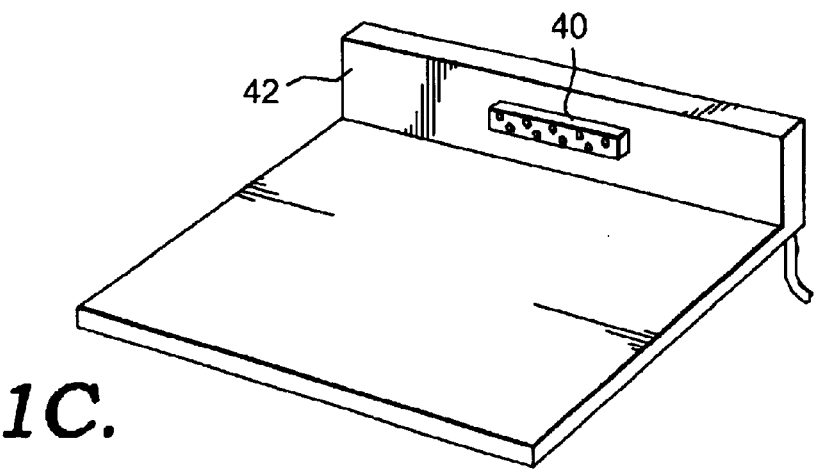
FIG. 1C is a perspective of the media docking station embodiment of FIG. 1A rotated 180 degrees.

Turing now to FIGS. 1A–1C, a first embodiment of a media docking system is provided and referenced generally by the numeral 12. Docking system 12 includes an MCRC 14 and a docking base 16. The MCRC 14 is equipped with a connector 18. Docking base 16 has a port face 19. The port face is a face (both sides) of base 16 where at least some of the communications ports are located. The port face 19 has an exterior face 20, which has a first plurality of communications ports 22.

The first plurality of communications ports 22 can include a variety of communications ports for coupling base 16 to an incoming media-stream port, to various other media devices, and/or to a display device. Exemplary communications ports include a network port 24, a phone/modem port 26, a set of RCA-type or composite ports 28, S-video ports 30, an optical port 32, and a pair of radio-frequency (RF) ports 34. The ports just mentioned and illustrated in FIG. 1A are not meant to be limiting in nature. The communications ports 22 are illustrative of the various media ports that can be included on base 16.

Those skilled in the art will appreciate a variety of other communications ports that could also be included on docking base 16. For example, an auxiliary port 36 could be a phonograph port, another audio/visual port, a dedicated audio port, a visual port, an additional S-video port, a monitor port, a component video port, an optical port, a coaxial port, a coaxial digital port, a multichannel port, a speaker port, a universal serial bus (USB) port, an IEEE 1394 port, an i.LINK port, an RS-232 port, a parallel port, a serial port, and the like. These various ports are illustrated with respect to auxiliary port 36 to simplify the drawings and figures, and included disclosure, but should not be interpreted as to limit the invention to only the ports illustrated on FIG. 1A. Similarly, both input and output ports could be provided. For instance, the set of composite ports 28 includes a set of input ports and output ports. Similarly, the S-video ports 30 and RF ports 34 also include both input and output ports.

Including input and output ports allows a loop-through, or pass through pathway, capability such that media content received through these various ports could be looped through and displayed on a display device without having the MCRC 14 connected. If the MCRC 14 is necessary to decode certain media signals, then the MCRC may be necessary. But signals, such as radio-frequency signals, that do not need to be decoded, could be passed through RF ports 34 and displayed on a display device or other receiving device without MCRC 18. Power is provided via power input 38.

As shown in FIG. 1B, connector 18 is operationally coupled to docking base 16 by way of connection port 40. Connection port 40 is on interior face 42 of port face 19. FIG. 1C illustrates the reverse perspective of FIG. 1A. Each of the first plurality of communications ports 22 is coupled to connection port 40 by a series of leads, which are not shown due to their conventional nature. Similarly, the interior electronics of MCRC 18 are also not shown in light of their conventional nature.

As previously mentioned a variety of communications ports 22 can be included on base 16, beyond those illustratively depicted. An optical-communications port 32 typically requires a fiber-optic cable, known as Toslik. But other optical conduits can be connected to optical port 32. A signal optically rather than electronically is virtually impervious to magnetic or electrical interference. A digital coaxial connection allows for the wide-frequency bandwidth of digital signals. Providing outputs such as RF outputs or composite outputs, allow docking base 16 to be connected to a variety of recording devices, such as a minidisc recorder, CD recorder, other optical recorder, DVD recorder, VCR, PVR, tape-cassette recorder, or camcorder. As previously mentioned, although shown circular with interior holes, auxiliary port 36 is not intended to be limited to such a physically oriented port.

Auxiliary port 36 could be an IEEE 1394 or fire-wire port. A fire-wire port is a fast two-way digital connection used between computers and peripherals. iLINK ports are often 4 pin but could also be in a spin configuration. To connect the docking base 16 to a Local Area Network (LAN), Wide Area Network (WAN), or the Internet, a network port 24 is provided. Typically, this network port 24 is a RJ 45 jack configured for Ethernet communication of TCP/IP packets. To allow updates of program listings, as used in satellite TV programming, a telephone or modem port 26 is provided.

Thus, in this embodiment, the detachable MCRC 14 is equipped with connector 18, which is received by connector 40, to operationally couple the MCRC 14 to the docking base 16. Connector 18 mates with connector 40 and is connected to the conventional interior electronics of MCRC 14. With the MCRC mated to docking base 16, media content from an incoming stream can be communicated to a receiving device.

The receiving device is not limited to a display device. Exemplary display devices include a monitor, an LCD screen, a Thin Film Transistor (TFI display, a "flat-panel" display, a High Definition Television (HDTV), a handheld device, and a projection device. The output from docking base 16 could be connected to other media-realizing devices, including an audio device such as a stereo receiver or a speaker. Other media-realizing devices include a media-recording device for recording the video streams passing through docking base 16. Exemplary recording devices include a VCR, a DVD recorder, a personal video recorder, a CD recorder, a tape-cassette recorder, and a camcorder.

Figure 2A:
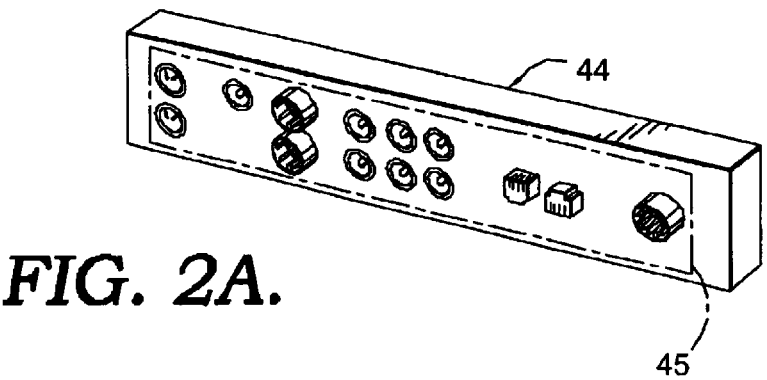
FIG. 2A is a perspective view of the reverse side of the adapter depicted in FIG. 2C.

Turning now to FIG. 2A, an alternative embodiment of the present invention is provided and referenced generally by the numeral 44. In this embodiment, an adapter 44 is provided for coupling a conventional MCRC 46 to base 16. FIG. 2A shows one side of adapter 44, the other side is illustratively depicted in FIG. 2B. Shown in FIG. 2A is an illustrative third set of communications ports 45 situated and configured in such a way as to mate with communications ports 48 of conventional MCRC 46 (See FIG. 2B).

Figure 2B:
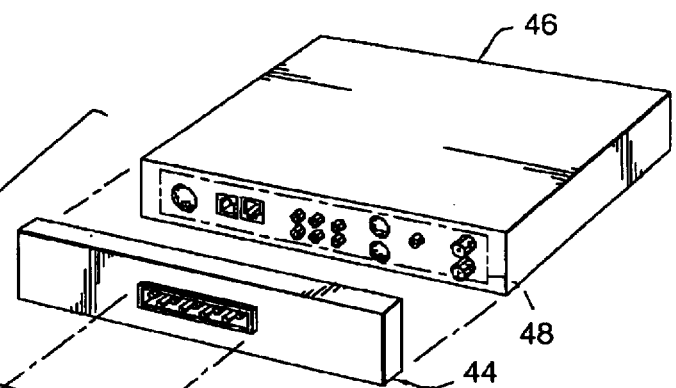
FIG. 2B is a perspective view of the present invention embodied in an adapter that joins a conventional MCRC to a docking base.
Figure 2C:
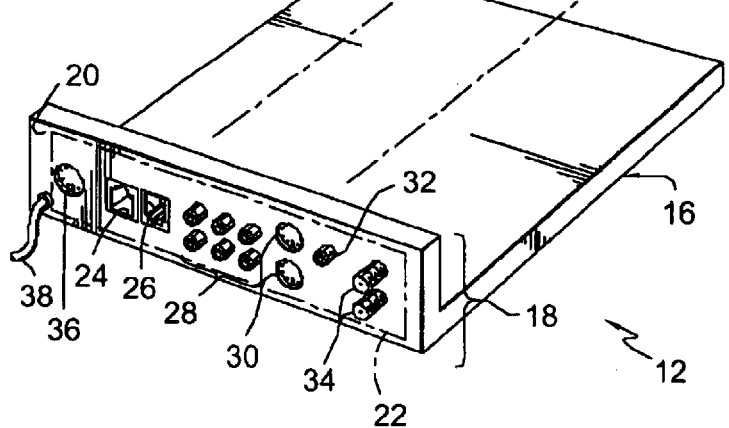
FIG. 2C is a side view of the adapter depicted in FIG. 2B.
Figure 2C:
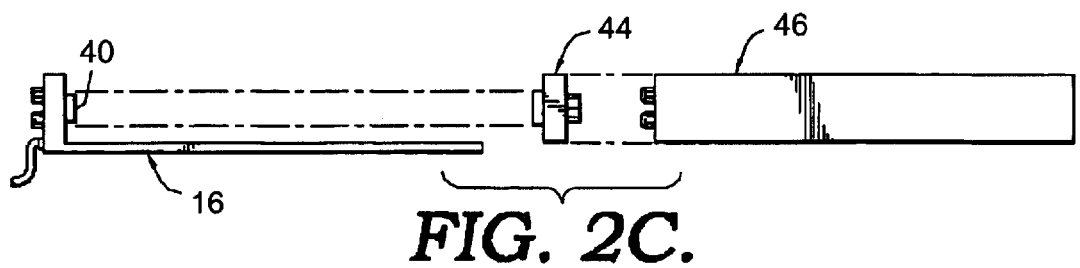

FIG. 2B illustrates adapter 44 in operation. For every male communications port on conventional MCRC 46, there is a corresponding female communications port on adapter 44. Similarly, for every female communications port on conventional MCRC 46, where is a corresponding male communications port on adapter 44.

Included on conventional MCRC 46 is a second set of communications ports 48. The second set of communications ports 48 are similar in nature to the first set of communications ports 22 on base 16. This embodiment does not require a specialized MCRC. Rather, adapter 44 mates with conventional MCRC 46 and also with base 16. Conventional MCRC 46 receives adapter 44, which is received by base 16.

This embodiment does not require a specialized MCRC. Rather, a conventional MCRC 46 mates with adapter 44, which then mates with base 16. In this embodiment multiple adapters could be manufactured to mate with specific media MCRCs. The third set of communications ports 45 are arranged so as to mate with the second set of communications ports 48. It is well understood that various vendors and manufactures of various set-top boxes, such as box 46, position the various communications ports 48 in specific locations. It is also appreciated that an army of various connectors are included above the set of communications ports 48. Each of these variations are well contemplated within the scope of the present invention, but providing figures and repetitive descriptions of each is impractical. It is for this reason that the various sets of communications ports illustrated throughout the figures and described wherein are truly illustrations only. One of the foremost ideas embodied by the present invention and claimed below is providing a removable box that is received by a quasi-permanently attached base unit 16. That is, a base unit with wiring that is not regularly rerouted but receives an MCRC that is regularly interchanged among base units.

Figure 3A:
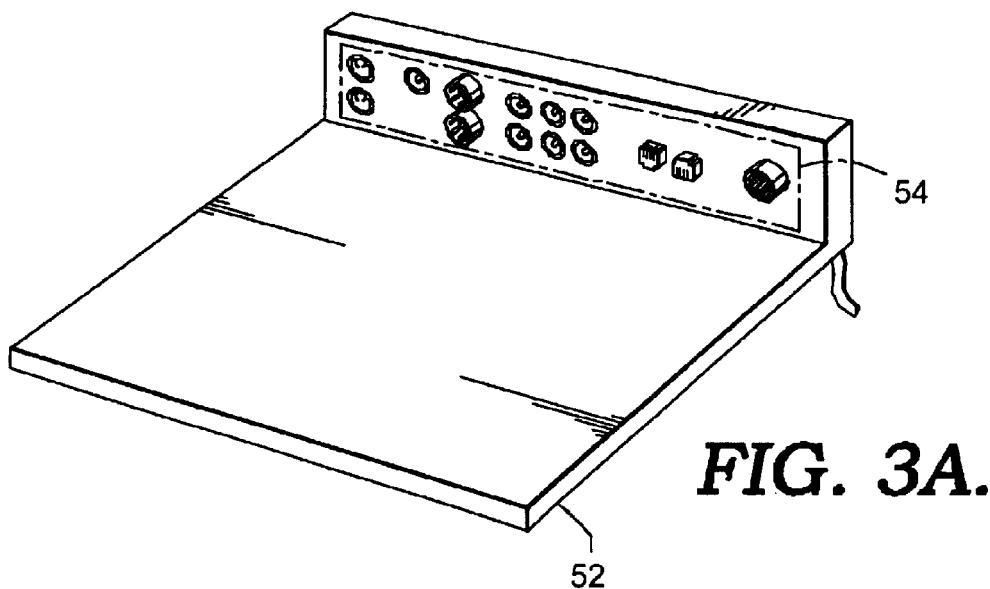
FIG. 3A is a perspective view of the docking base of FIG. 3A rotated 180 degrees.
Figure 3B:
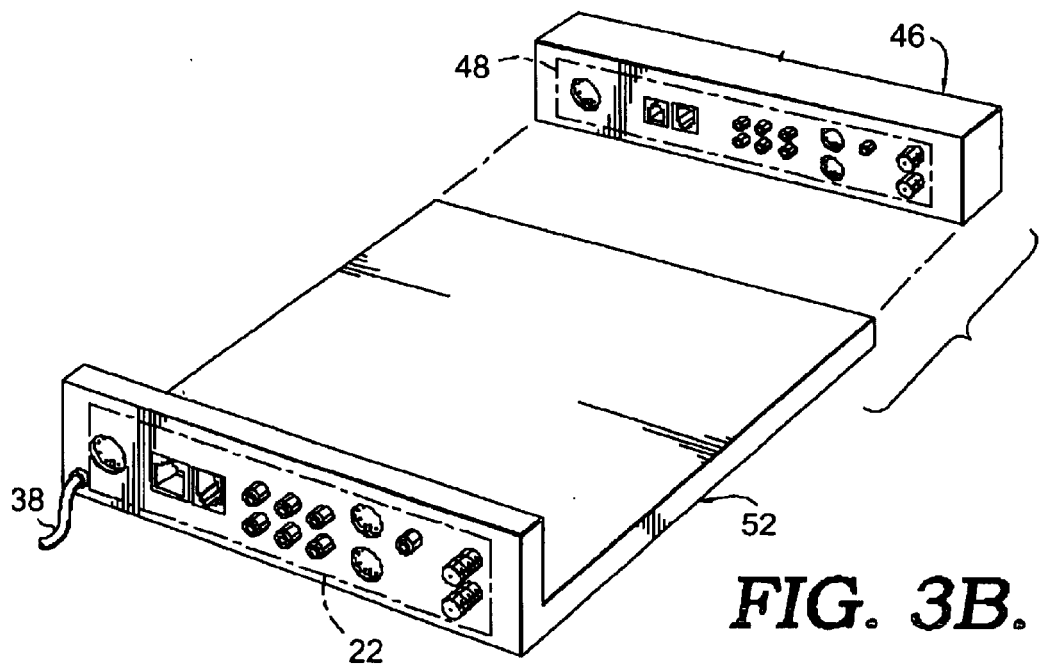
FIG. 3B is a perspective view of an alternative embodiment of a docking system that receives an MCRC without a universal adapter nor universal connections port.
Figure 3C:
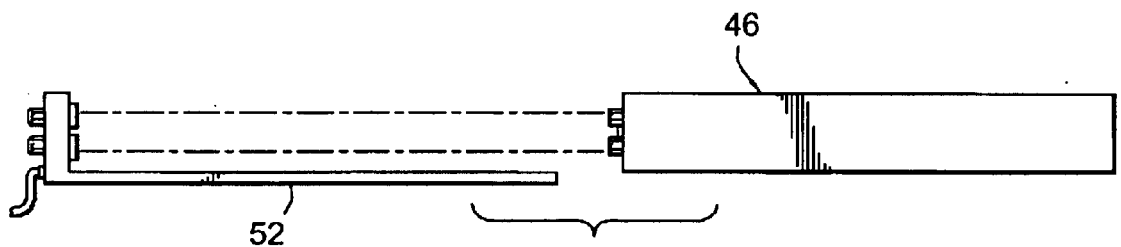
FIG. 3C is a side view of the media docking system of FIG. 3A.

Turning now to FIGS. 3A–3C, yet another embodiment of the present invention is illustrated. In this embodiment, a specialized docking base is provided and referenced generally by the numeral 52 in FIG. 3A. A conventional MCRC 46 mates directly with specialized docking base 52, without the use of an adapter, such as adapter 44. Specialized docking base 52 has yet another set of communications ports 54, which mate directly with the communications ports 48 of the conventional MCRC 46 (FIG. 3B). Thus, the fourth set of communications ports 54 are configured and arranged in such a way so as to operationally couple conventional MCRC 46 to specialized docking base 52. The fourth set of communications ports 54 are similar in nature to the first plurality of communications ports 22.

FIG. 3B illustrates that specialized docking base 52 directly receives conventional MCRC 46. Again, because of the specific arrangement of the various ports 48 on MCRC 46, the corresponding ports of fourth communications-port set 54 are situated in such a way as to receive MCRC 46. Showing each variation is impractical, thus FIGS. 3A and 3B and shown to illustrate an embodiment of the present invention where a conventional MCRC is received directly by base 52. In this embodiment, base 52 remains wired to an end-users electronic components and to a display device. An end-user can have multiple boxes 52 placed throughout his/her house. Although multiple MCRCs could be bought, only one is necessary because the user can simply remove the MCRC from one base and slide it into another. With the MCRC received by the base, media content can be viewed on a display device. Base 52 also includes pass-through for the various connections, such as RF ports 34, S-video ports, 30, and composite ports 28, so that video provided by an eternal source that does not require the decoding offered by MCRC 46 can be viewed.

As can be seen, the present invention and its equivalents are well adapted to provide a new and useful method for viewing media content on televisions in different locations using a media docking station. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention It will be understood that certain features and subcombinations are of utility and may be employed without reference to other features and subcombinations and are scope of the claims. Not all steps listed in the various figures need be carried out in specific order described.

What is claimed is:

1. A media-content-receiving component (MCRC) docking system, comprising:
   a detachable MCRC having a connector; and
   a docking base comprising:
   (1) a connection port for operationally receiving the connector and;
   (2) a plurality of communications ports for communicating media content to a receiving device inputted thorough the communications ports, wherein the plurality of communications ports includes one or more sets of input ports and one or more respective sets of output ports that establish one or more loop-through pathways, which allow all or a portion of the media content to be communicated to the receiving device without the MCRC.

2. The docking system of claim 1, where said MCRC communicates a media-content signal to said receiving device.

3. The docking system of claim 2, wherein the media-content signal is one or more of the following signal types: cable television (CATV), satellite, Web cast, digital CATV, broadcast television, digital audio, a serial signal, and/or an Internet Protocol (IP).

4. The docking system of claim 3, wherein said plurality of communications ports includes one or more of the following: a phonograph port, an audio/visual port, an audio port, a visual port, an S-video port, a monitor port, a radio-frequency (RF) port, a component-video port, an optical port, a coaxial port, a coaxial digital port, a multichannel port, a speaker port, a universal serial bus (USB) port, an IEEE 1394 port, a telephone port, a modem port, a network port, an i.LINK port, an RS-232 Port, a parallel port, a serial port, an RJ-11 jack, and/or an RJ-45 jack.

5. The docking system of claim 4, wherein said receiving device includes a media-realizing device.

6. The docking system of claim 5, wherein said media-realizing device includes a display device.

7. The docking system of claim 6, wherein said display device includes one or more of the following: a monitor, an LCD screen, a Thin Film Transistor (TFT) display, a "flat-panel" display, a High-Definition Television (HDTV), a handheld device, and/or a projection device.

8. The docking system of claim 5, wherein said media-realizing device includes an audio device.

9. The docking system of claim 8, wherein said audio device includes one or more of the following: a stereo receiver and/or a speaker.

10. The docking system of claim 5, wherein said media-realizing device includes a media-recording device.

11. The docking system of claim 10, wherein said media-recording device includes one or more of the following: a VCR, a DVD recorder, a Personal Video Recorder (PVR), a CD recorder, a tape-cassette recorder, and/or a camcorder.

12. A docking base comprising:
   a communications port for operationally coupling a media-content-receiving component (MCRC) to the docking base and communicating media content from an external source through the MCRC to a receiving device;
   a media-input port for receiving the media content; and
   a media-output port for communicating the media content to the receiving device;

wherein the media-input port and the media-output port are coupled together to provide a loop-through pathway in the absence of the MCRC, the loop-through pathway allowing all or a portion of the media content to be communicated from the media-input port through the media-output port to the receiving device in the absence of the MCRC.

13. The docking base of claim 12, wherein said MCRC is one of the following: a cable-TV receiver, a digital-cable-TV receiver, a satellite-TV receiver, an Internet-access receiver, a personal video recorder (PVR), a Web.TV receiver, a digital-video receiver, and/or a digital-audio receiver.

14. The docking base of claim 12, wherein the media content is one or more of the following signal types: analog cable television (CATV), satellite, Web cast, digital CATV, broadcast television, digital audio, a serial signal, High Definition Television (HDTV), and an Internet Protocol (IP).

15. The docking base of claim 14, further comprising a plurality of auxiliary communications ports including one or more of the following: a phonograph port, an audio/visual port, an audio port, a visual port, an S-video port, a monitor port, a radio-frequency (RF) port, a component-video port, an optical port, a coaxial port, a coaxial digital port, a multichannel port, a speaker port, a universal serial bus (USB) port, an IEEE 1394 port, a telephone port, a modem port, a network port, an i.Link port, an RS-232 Port, a parallel port, a serial port, an RJ-11 jack, and an RJ-45 jack.

16. The docking base of claim 15, wherein the receiving device includes a media-realizing device.

17. The docking base of claim 16, wherein the media-realizing device includes a display device.

18. The docking base of claim 17, wherein the display device includes one or more of the following: a television, a monitor, an LCD screen, a Thin Film Transistor (TFT) display, a "flat-panel" display, a High Definition Television (HDTV), a handheld device, and/or a projection device.

19. The docking base of claim 16, wherein the media-realizing device includes an audio device.

20. The docking base of claim 19, wherein the audio device includes one or more of the following: a stereo receiver and/or a speaker.

21. The docking base of claim 15, wherein the media-realizing device includes a media-recording device.

22. A media-docking base system including a base member, said base member comprising;
a receiving area dimensioned to accommodate placement of a media-content-receiving component (MCRC) that does not function divorced from said base member; and
a connection port disposed within the receiving area such that when the MCRC is placed into the base-member-receiving area, media content can be communicated through said base member and said MCRC to a receiving device.

23. The system of claim 22, where said media content is one or more of the following signal types: cable television (CATV), satellite, Web cast, digital CATV, broadcast television, digital audio, a serial signal, and an Internet Protocol (IP).

24. The system of claim 23, further comprising:
a pass through pathway, whereby an incoming signal is communicated to said receiving device when said MCRC is not coupled with said base member.

25. A media-component-docking adapter for coupling a conventional media-content-receiving component (MCRC) to a docking base having a connection port, comprising:
a first face having a first plurality of communications ports, said first plurality of communications ports configured to operationally couple said adapter to said conventional MCRC; and
a second face having a connector coupled to said first plurality of communications ports, said connector configured to be operationally received by said connection port,
whereby said conventional MCRC is received by said docking base via said adapter to communicate media content to a receiving device.

26. The adapter of claim 25, wherein said MCRC is one of the following: a cable-TV receiver, a digital-cable-TV receiver, a satellite-TV receiver, an Internet-access receiver, a personal-video-recorder (PVR), a Web-TV receiver, a digital-video video receiver, and a digital-audio receiver.

27. The adapter of claim 26, wherein said plurality of communications ports are positioned to mate with a second plurality of communications ports on said MCRC.

28. The adapter of claim 27, wherein said second plurality of communications ports includes one or more of the following: a phonograph port, an audio/visual port, an audio port, a visual port, an S-video port, a monitor port, a radio-frequency (RF) port, a component-video port, an optical port, a coaxial port, a coaxial digital port, a multichannel port, a speaker port, a universal serial bus (USB) port, an IEEE 1394 port, a telephone port, a modem port, a network port, an i.Link port, an RS-232 Port, a parallel port, a serial port, an RJ-11 jack, and/or an RJ-45 jack.

29. The adapter of claim 28, whereby said MCRC communicates a media-content signal to said receiving device.

30. The adapter of claim 29, wherein the media-content signal is one or more of the following signal types: cable television (CATV), satellite, Web cast, digital CATV, broadcast television, digital audio, a serial signal, and/or an Internet Protocol (IP).

31. A docking structure comprising:
a docking base having a first plurality of communications ports including a coaxial-connector port on an interior face coupled to a second plurality of communications ports on an exterior face, said first plurality of communications ports including a coaxial-connector port and situated to operationally receive a conventional media-content-receiving component (MCRC) and said second plurality of communications ports adapted to communicate media content though said docking base and said MCRC to a receiving device.

32. The docking structure of claim 31, wherein said first plurality of communications ports include one or more of the following; a phonograph port, an audio/visual port, an audio port, a visual port, an S-video port, a monitor port, a radio-frequency (RF) port, a component-video port, an optical port, a coaxial digital port, a multichannel port, a speaker port, a universal serial bus (USB) port, an IEEE 1394 port, a telephone port, a modem port, a network port, an i.Link port, an RS-232 Port, a parallel port, a serial port, an RJ-11 jack, and/or an RJ 45 jack.

33. A method for providing for the communication of media content from a media source to a receiving device, comprising:
providing a media-content-receiving component (MCRC) adapter having a first face and a second face, said first face having a first plurality of communications ports for operationally attaching said adapter to an MCRC and said second face having a connector coupled to said first plurality of communications ports; and
providing a docking base having an interior and exterior face, said exterior face having a second plurality of communications ports for communicating media content to a receiving device and said interior face having a connection port for receiving said adapter via said connector.

34. A cable television (CATV) reception system comprising:
  a first connection means to operationally couple a CATV reception module to a docking base, whereby media content is communicated from the docking base to a receiving device when the CATV reception module is mated with the docking base, and a portion of the media content is communicated from the docking base to the receiving device when the CATV reception module is not coupled to the docking base.

35. The CATV reception module of claim 34, wherein said CATV reception module communicates a media-content signal to said receiving device.

36. The CATV reception system of claim 35, wherein the media-content signal is one or more of the following signal types: analog cable television (CATV), satellite, Web cast, digital CATV, broadcast television, digital audio, a serial signal, and/or an Internet Protocol (IP).

37. A detachable media-content-receiving component (MCRC) comprising:
  a communications port for operational connection to a docking base;
  wherein the MCRC must be coupled to the docking base to operate, the docking base comprising a connection port for operationally receiving the connector,
  whereby media content can be communicated from the docking base through the MCRC to a receiving device.

* * * * *